US006533435B2

(12) United States Patent
Brown

(10) Patent No.: US 6,533,435 B2

(45) Date of Patent: Mar. 18, 2003

(54) MICRO LIGHT BEACON

(76) Inventor: Tracy Blair Brown, 296 Jacobs Rd., Ringgold, GA (US) 30736

( * ) Notice: Subject to any disclaimer, the term of this patent is extended or adjusted under 35 U.S.C. 154(b) by 0 days.

(21) Appl. No.: 09/924,519

(22) Filed: Aug. 9, 2001

(65) Prior Publication Data

US 2002/0021567 A1 Feb. 21, 2002

Related U.S. Application Data

(60) Provisional application No. 60/226,249, filed on Aug. 17, 2000.

(51) Int. Cl.[7] .............................. F21L 4/00; H04M 1/22

(52) U.S. Cl. ........................ 362/191; 362/195; 362/226; 362/581; 362/800

(58) Field of Search ................................ 362/191, 145, 362/189, 195, 226, 581, 800, 153, 153.1, 394, 395; 200/310, 311, 313

(56) References Cited

U.S. PATENT DOCUMENTS

| | | | | | |
|---|---|---|---|---|---|
| 1,099,381 | A | | 6/1914 | Krafft | 362/157 |
| 1,165,970 | A | | 12/1915 | Harris | 340/321 |
| 1,211,967 | A | | 1/1917 | Schweitzer | 335/23 |
| 2,490,669 | A | | 12/1949 | Burke | 43/17 |
| 4,337,504 | A | * | 6/1982 | Simpson | 362/104 |
| 4,358,708 | A | * | 11/1982 | Silva et al. | 315/58 |
| 6,132,060 | A | * | 10/2000 | Gallo | 362/190 |

* cited by examiner

*Primary Examiner*—Sandra O'Shea
*Assistant Examiner*—Sharon Payne
(74) *Attorney, Agent, or Firm*—Patent & Trademark Services; Joseph H. McGlynn

(57) ABSTRACT

A a portable light which has an enclosure, a battery, a light emitting diode and a mounting for the light. The light can be mounted in a variety of locations and the diode can be easily turned on and off.

9 Claims, 1 Drawing Sheet

MICRO LIGHT BEACON

Applicant claims the priority of Provisional Ser. No. 60/226,249, filed Aug. 17, 2000.

BACKGROUND OF THE INVENTION

This invention relates, in general, to lights, and, in particular, to a portable light.

DESCRIPTION OF THE PRIOR ART

In the prior art various types of lights have been proposed. For example, U.S. Pat. No. 1,099,381 to Krafft discloses a pocket lamp with a base with a pair of contacts and a series resistance is wound around one of the contacts to protect the lamp bulb.

U.S. Pat. No. 1,165,970 to Harris discloses a glove having a bulb secured to the palm and two contacts extending into two of the fingers of the glove, and when the fingers are held together, the bulb is lit.

U.S. Pat. No. 1,211,967 to Spencer et al discloses a light for a tie tack which has a pin to hold the tie tack and which is connected to a source of power such as a battery.

U.S. Pat. No. 2,490,669 to Burke discloses an illuminated fishing bobber having a bulb and a pivoted switch which will activate the light when the switch hits an object.

SUMMARY OF THE INVENTION

The present invention is directed to a portable light which has an enclosure, a battery, a light emitting diode and a mounting for the light. The light can be mounted in a variety of locations and the diode can be easily turned on and off.

It is an object of the present invention to provide a new and improved portable light.

It is an object of the present invention to provide a new and improved portable light which can be easily turned on and off as required.

It is an object of the present invention to provide a new and improved portable light which is small and can be easily used in a variety of locations.

These and other objects and advantages of the present invention will be fully apparent from the following description, when taken in connection with the annexed drawings.

DESCRIPTION OF THE PREFERRED EMBODIMENT

Figure 1:
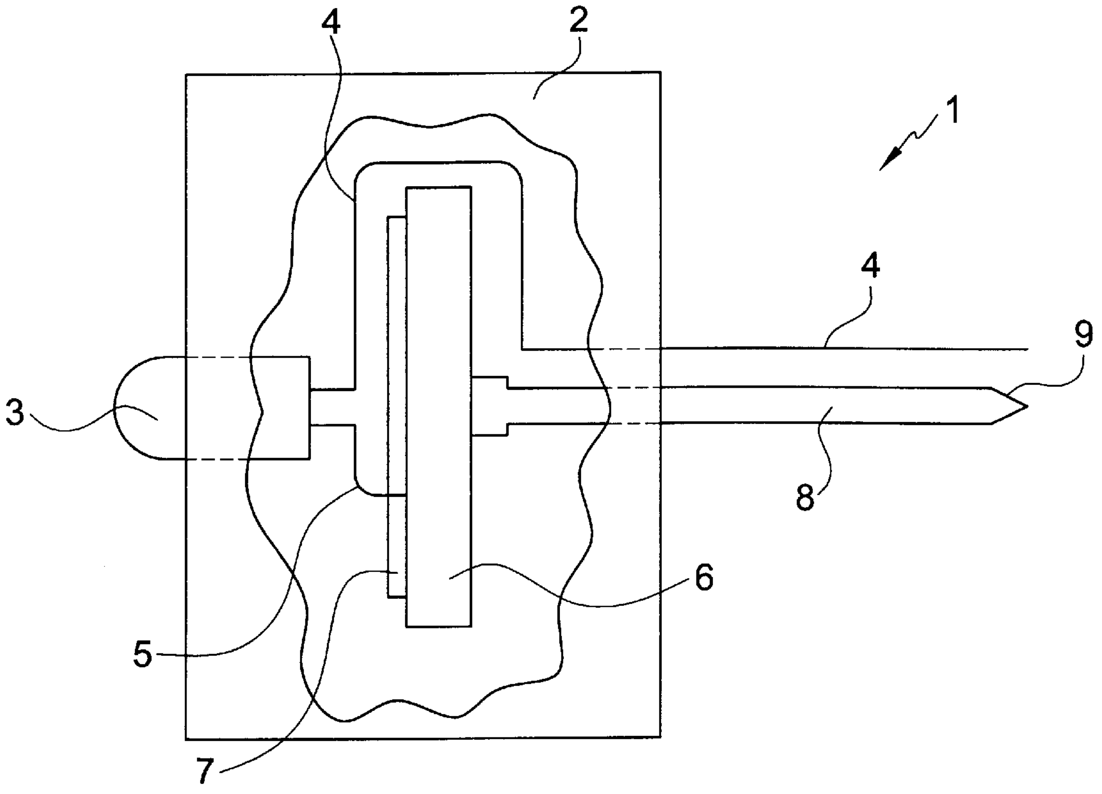
FIG. 1 is a side view with a cutaway portion showing the internal components of the present invention.
Figure 2:
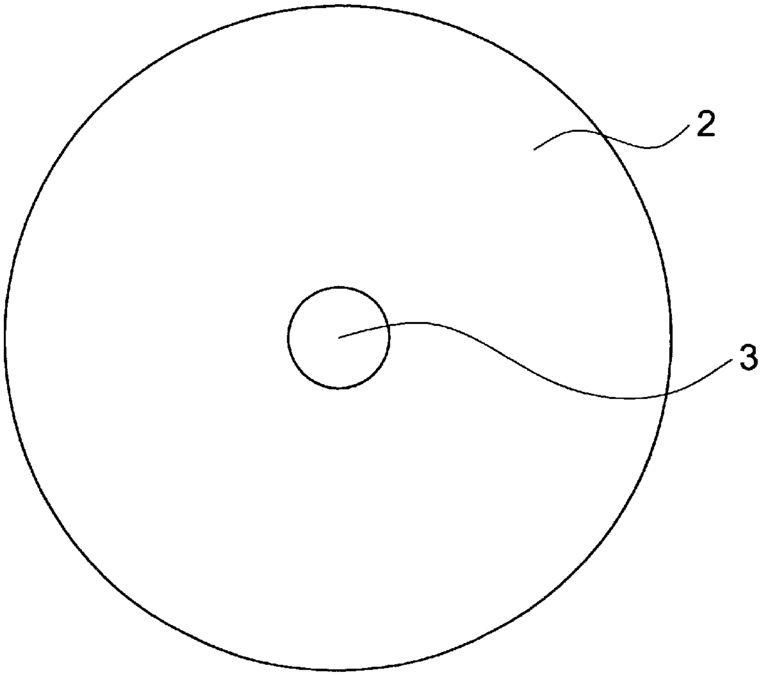
FIG. 2 is a front view of the present invention.

Referring now to the drawings in greater detail, FIG. 1 shows a side view with a cutaway portion showing the internal components of the present invention 1. The present invention comprises a housing 2, which has a plurality of components embedded therein. An LED 3 is embedded in the housing 2 so that one end of the LED protrudes from the front of the housing 2. The other end of the LED is positioned within the housing so the anode and cathode connections can be made to the power supply.

It should be noted that although the preferred embodiment utilizes a housing that is molded around the internal components, other variations which do not include a molded housing can be used. The main reason for the molded housing is to protect the internal components from water, dirt, debris, etc. However, if the light 1 will not be used in a hostile environment, the housing can be assembled around the internal components in a manner other than molding. Also, while an LED is the preferred light source, other light sources could be used without departing from the scope of the invention.

The cutaway portion, shown in FIG. 1, shows the anode connection to the LED as having an electrical wire 4 leading from the anode connection to the outside of the housing 2. This wire is preferably flexible but with a small amount of resiliency, for reasons which will be explained below.

The wire 5 connected to the cathode side of the LED is passed through (or around) the insulator 7 and connected to the minus terminal on the power source 6, which in the preferred embodiment is a battery. Although a "flat" type battery is shown, any battery or other power source that will serve the intended function can be used.

An insulator 7 of any conventional material can be secured to the minus side of the battery in order to prevent the anode wire 4 from contacting the minus side of the battery in order to prevent "shorting" of the LED. It should be noted that the insulator 7 is shown as being on only the side of the battery facing the LED, however, the insulator could be placed at any location on the battery if necessary. For example, the insulator could be continued up to the top of the battery to prevent the anode wire 4 from accidentally contacting the battery.

Attached to the positive side of the battery 6 is a mounting means 8. The preferred mounting means 8, shown in the drawings, is a post with a pointed tip 9, although other mounting means could be used without departing from the scope of the invention. The post 8 could be pushed into any surface and, thereby, secure the light 1 to that surface. This will allow a user to position the light on any surface, and at any location on that surface, merely by pushing the post 8 into the surface.

In order to use the light of the present invention, a user would wrap the flexible wire 4 around the post 8. Since the wire 4 is not resilient, or at least has very little resiliency, the wire will remain wrapped around the post and will not have a tendency to unwrap itself. Since the post 8 is attached to the plus side of the battery 6 (by any conventional means), and the wire 5 is attached to the minus side of the battery, wrapping the wire 4 around the post 8 completes a circuit between the battery and the LED, and the LED will light up. When a person wants to turn the LED off, he/she merely has to unwrap the wire 4 from around the post 8 and the connection will be broken and the LED will turn off.

The present invention can be used in a variety of situations in which a user wants a portable light. For example, a person could used the light to mark a trail in the woods or in a cave so they could find their way back out. By using a different mounting means parents could attach the light to their children's clothing on Halloween so they would be illuminated at night. Other uses for the present invention could be conceived without departing from the scope of the invention.

Although the Micro Light Beacon and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A portable light comprising:

a light source, means connected to said light source for providing electricity to said light source, said means for providing electricity to said light source having a positive terminal and a negative terminal, means connected to said light source and to one of said positive and negative terminals for electrically connecting said light source to one of said positive and negative terminals, said portable light having a mounting means for mounting said portable light to a surface, said mounting means being electrically connected to another of said positive and negative terminals, flexible means connected at one end to said light source, and said flexible means being electrically and mechanically directly connected at another end to said mounting means when it is desired to turn on said portable light.

2. The portable light as claimed in claim 1, wherein said connection between said flexible means and said mounting means is a detachable connection.

3. The portable light as claimed in claim 1, wherein said portable light includes a housing, said light source protrudes from a side of said housing, and said mounting means and said flexible means protrude from another side of said housing.

4. The portable light as claimed in claim 1, wherein said mounting means has a pointed end.

5. A portable light comprising:

a light source, means connected to said light source for providing electricity to said light source, said means for providing electricity to said light source having a positive terminal and a negative terminal, means connected to said light source and to one of said positive and negative terminals for electrically connecting said light source to one of said positive and negative terminals, said portable light having a mounting means for mounting said portable light to a surface, said mounting means being electrically connected to another of said positive and negative terminals, flexible means connected at one end to said light source, and wherein said flexible means is wrapped around said mounting means in order to turn said light source on.

6. A portable light comprising:

a light source, means connected to said light source for providing electricity to said light source, said means for providing electricity to said light source having a positive terminal and a negative terminal, means connected to said light source and to one of said positive and negative terminals for electrically connecting said light source to one of said positive and negative terminals, said portable light having a mounting means for mounting said portable light to a surface, said mounting means being electrically connected to another of said positive and negative terminals, means for turning said light source on and off, and wherein said means for turning said light source on and off comprises:

flexible means connected at one end to said light source, and said flexible means electrically connected at another end to said mounting means, and said light source is turned on when said flexible means is wrapped around said mounting means.

7. The portable light as claimed in claim 6, wherein said connection between said flexible means and said mounting means is a detachable connection.

8. The portable light as claimed in claim 6, wherein said portable light includes a housing, said light source protrudes from a side of said housing, and said mounting means and said flexible means protrude from another side of said housing.

9. The portable light as claimed in claim 6, wherein said mounting means has a pointed end.

* * * * *